United States Patent
Brändström et al.

(10) Patent No.: US 9,874,493 B2
(45) Date of Patent: Jan. 23, 2018

(54) METHOD AND APPARATUS FOR COMBINING TORQUE AND ANGLE REPRESENTATION

(75) Inventors: Ulf Roland Brändström, Bagarmossen (SE); Per Ingemar Forsberg, Värmdö (SE); Fredrik Redin, Stockholm (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 447 days.

(21) Appl. No.: 14/411,007

(22) PCT Filed: Jun. 26, 2012

(86) PCT No.: PCT/EP2012/062340
§ 371 (c)(1),
(2), (4) Date: Mar. 10, 2015

(87) PCT Pub. No.: WO2014/000772
PCT Pub. Date: Jan. 3, 2014

(65) Prior Publication Data
US 2015/0177098 A1    Jun. 25, 2015

(51) Int. Cl.
*G01L 1/00* (2006.01)
*G01M 13/02* (2006.01)
(Continued)

(52) U.S. Cl.
CPC ........... *G01M 13/021* (2013.01); *B25B 21/00* (2013.01); *B25B 23/14* (2013.01); *F16H 57/01* (2013.01); *F16H 2057/012* (2013.01)

(58) Field of Classification Search
CPC .... F16H 57/01; F16H 2057/012; F16H 61/12; G01M 13/021
(Continued)

(56) References Cited

U.S. PATENT DOCUMENTS 6,225,892 B1 * 5/2001 Chene ..................... F16H 57/01
340/438
8,276,450 B2 * 10/2012 Engelbreit .......... G01M 13/021
73/593

FOREIGN PATENT DOCUMENTS

DE    10137303 A1    5/2002
WO    2011104433 A1   9/2011

OTHER PUBLICATIONS

International Search Report (ISR) and International Preliminary Report on Patentability (IPRP) dated Feb. 26, 2013 issued in International Application No. PCT/EP2012/062340.

* cited by examiner

*Primary Examiner* — An Do
(74) *Attorney, Agent, or Firm* — Holtz, Holtz & Volek PC (57) ABSTRACT

An improved method and apparatus for creating a representation of transferred torque ($\tau_{tr}$) over a rotation angle interval ($\alpha$) for a torque transferring system wherein the torque transferring system includes at least two meshing gears, a torque meter for monitoring the transferred torque ($\tau_{tr}$) in the torque transferring device, and an angular meter arranged to monitor an angular position ($\alpha$) of at least one of the meshing gears over at least one angular interval ($\alpha_{int}$). Further, the system includes a processor that is adapted to: map the transferred torque ($\tau_{tr}$) to the monitored angular interval ($\alpha_{int}$) and create a representation of the transferred torque ($\tau_{tr}$) over said angular interval ($\alpha_{int}$), analyze said representation in order to identify deviations from an expected representation, and based on said analysis determining a gear condition of at least one of the at least two meshing gears in the torque transferring device.

17 Claims, 5 Drawing Sheets

(51) Int. Cl.
*F16H 57/01* (2012.01)
*B25B 21/00* (2006.01)
*B25B 23/14* (2006.01)

(58) Field of Classification Search
USPC .............................................. 702/33, 35, 41
See application file for complete search history.

METHOD AND APPARATUS FOR COMBINING TORQUE AND ANGLE REPRESENTATION

FIELD OF THE INVENTION

The present invention relates to an apparatus for determining a gear condition of meshing gears in a torque transferring device.

The present invention also relates to a method of determining a gear condition of meshing gears in a torque transferring device.

Further, the present invention relates to a computer program and a computer program product implementing the method of the invention.

RELATED ART AND BACKGROUND OF THE INVENTION

In torque transferring systems that involve a torque transferring device it is important to be able to determine a condition of the torque transferring device. A torque transferring device may e.g. be a power tool such as a nutrunner, or a transmission apparatus, such as a gear box. It is, for example important to be able to determine a condition of the meshing gears included in the torque transferring device. Such meshing gears include spiral bevel gears, consisting of a crown gear and a pinion gear, fixed ring gears, sun gears, planet gears, and essentially any other gears that are used for transferring the torque through the system.

In this document, the invention will be described mainly for its implementation in a tool, such as a nutrunner. However, the invention is generally applicable to essentially any other torque transferring system.

A nutrunner provides a torque to a nut in order to tighten or loosen the nut. The nutrunner includes meshing gears. The purpose of these gears is mainly to increase the amount of torque that can be provided to the nut by the nutrunner, which is achieved by gearing down the rotation motor of the nutrunner by means of said gears. The gears may also serve as angle gears to change the axis of rotation of the torque. The angular rotational speed that is provided by a motor in the nutrunner is geared down by the meshing gears to a degree that corresponds to the relation of the number of cogs on the meshing gears, whereby the torque applied to the nut is increased to a corresponding degree at the same time as the rotational speed is decreased to the same degree.

Hence, the meshing gears are a vital part of such a torque transferring devices, and it is important that their condition is good.

Torque transferring devices, such as tools, are widely used in e.g. manufacturing and repair processes. Such manufacturing or repair processes rely on the well function of the tools for securing a continuous manufacturing or repairing. In order to avoid manufacturing or repairing pauses, that are both annoying and expensive for the manufacturer or repairer, it is important to be aware of the condition of the tools that are used in the manufacture or repair process.

In known solutions to this problem, the tools are taken out of use, e.g. out of the manufacturing or repairing process, and are analyzed under controlled conditions in an external analysis apparatus for tool condition determination. Thus, an external apparatus is needed for performing this analysis, which of course adds on to the manufacturing or repairing costs.

Also, since the tools have to be taken out of use when they are analyzed, the manufacturing or repairing process has to be stalled during the analysis, or there has to be an abundance of tools present at the manufacturing or repairing site, such that a replacement tool could be put to work when the analysis is performed.

Both stalling of the manufacturing or repairing and purchasing of replacement tools add to the production or maintenance costs for the items that are being produced or repaired. Since cost is a crucial competition factor in manufacturing and repairing processes, it is important to minimize the costs involved in tool condition control.

SHORT DESCRIPTION OF THE INVENTION

It is an object of the present invention to provide a method and an apparatus that solves the above stated problem by providing a possibility to determine a condition for the torque transferring device during normal operation of the torque transferring device.

According to a first aspect of the invention the object is achieved by an apparatus for determining a gear condition of meshing gears in a torque transferring device, which torque transferring device comprises: at least two meshing gears, a torque meter for monitoring the transferred torque $\tau_{tr}$ in the torque transferring device, and an angular meter arranged to monitor an angular position $\alpha$ of at least one of the meshing gears over at least one angular interval $\alpha_{int}$. Further, the apparatus comprises a processor that is adapted to: map the transferred torque $\tau_{tr}$ to the monitored rotation angle $\alpha$ and create a representation of the transferred torque $\tau_{tr}$ over said angular interval $\alpha_{int}$, analyze said representation in order to identify deviations from an expected representation, and based on said analysis determining a gear condition of at least one of the at least two meshing in the torque transferring device.

In a specific embodiment of the invention the processor is adapted to analyze the angular periodicity at which said deviation occurs in order to locate the cause of the deviation to one of said meshing gears.

In another embodiment the processor is adapted to analyze the amplitude of the transferred torque $\tau_{tr}$ in order to identify deviations from an expected torque amplitude.

In yet another embodiment the processor is adapted to: combine at least two individual representations of the transferred torque $\tau_{tr}$ over at least two monitored angular interval $\alpha_{int}$, each individual representation including at least one transferred torque $\tau_{tr}$ over at least one corresponding monitored angular interval $\alpha_{int}$; create a combined representation from the combination of the at least two individual representations; and analyze said combined representation in order to determine a gear condition of at least one of said at least two meshing gears.

The processor may be adapted to a create a combined representation that include information of the transferred torque $\tau_{tr}$ over an angle interval $\alpha_{int}$ corresponding to a complete rotation for at least one of said at least two meshing gears.

Further, the processor may be adapted to remove a trend from each individual representation before combining them, in order to determine a detrended representation that has an amplitude that is centered around a specific constant torque, wherein the detrending performed by the processor is arranged to compensate each individual representation for a varying transferred torque $\tau_{tr}$ during said individual system operation, and wherein the combined representation of the at least two individual representations of said transferred torque $\tau_{tr}$ over said rotation angle $\alpha$ is based on the compensated representations.

The processor may be arranged in a separate control unit adapted to communicate with the torque transferring device, wherein the torque transferring device comprises a communication unit for communicating said transferred torque $\tau_{tr}$ and angle interval $\alpha_{int}$ of the meshing gears to the control unit.

Also, the apparatus may include a signaling device for signaling deterioration of at least one of said at least two meshing gears to an operator, such that the operator may take necessary measures.

Specifically the torque transferring device may be a nutrunner, and said individual representation of said transferred torque $\tau_{tr}$ over said angle interval $\alpha_{int}$ may be an individual nut tightening or nut loosening.

According to a second aspect of the invention the object is achieved by a method of determining a gear condition of meshing gears in a torque transferring device including at least two meshing gears, a torque meter for monitoring the transferred torque $\tau_{tr}$, and an angular meter arranged to continuously monitor an angular position $\alpha$ of at least one of the meshing gears over at least one angle interval $\alpha_{int}$. The method includes the following steps: mapping the monitored torque $\tau_{tr}$ to the monitored angular position of the meshing gears to create a representation of said transferred torque $\tau_{tr}$ over said angle interval $\alpha_{int}$, analyzing said representation in order to identify deterioration of at least one of said at least two meshing gears.

In a specific embodiment the method includes the further steps of: analyzing the amplitude of the transferred torque ($\tau_{tr}$) in order to identify deviations from an expected torque amplitude.

In another embodiment the method includes the further steps of: combining at least two individual representations of said transferred torque $\tau_{tr}$ over at least two angle intervals $\alpha_{int}$, each individual representation including a transferred torque $\tau_{tr}$ over an angle interval $\alpha_{int}$ of an individual system operation; and providing a combined representation from the combination of the at least two individual representations; analyzing said combined representation in order to identify deterioration of at least one of said at least two meshing gear.

In yet another embodiment an absolute angle $\alpha_{abs}$ is utilized for determining an angle relationship between two angularly differing individual representations, thereby allowing said two angularly differing individual representations to be joined together at a correct angular position $\alpha$.

The mapping of said at least two individual representations may include removing a trend from each one of said at least two individual representations, in order to determine a detrended individual representation that has an amplitude that is centered around a specific constant torque. The magnitude of the amplitude of the detrended individual representation may further be compensated for with respect to the trend of the amplitude.

In a specific embodiment the combined representation includes information of a transferred torque $\tau_{tr}$ over an angle interval corresponding to a complete rotation for all of said at least two meshing gears.

In a specific embodiment said analyzing step includes a transformation of a time domain signal of said combined representation into a frequency domain signal of said combined representation.

In a further embodiment an equidistant re-sampling is performed on said time domain signal of said combined representation or on at least two time domain signals of said at least two individual representations, respectively, before said transformation.

Said deterioration may be identified by comparing an amplitude of said frequency domain signal of said combined representation with at least one amplitude threshold.

The method may be performed in actual operation of the torque transferring device.

The object is also achieved by a computer program and a computer program product implementing the method of the invention.

Any step performed in the inventive method as described above and/or in the claims may be implemented in the apparatus as described above and/or in the claims. Particularly, such steps may be implemented in the operation of the processor of the apparatus, to be performed by said processor.

Detailed exemplary embodiments and advantages of the method and the apparatus according to the invention will now be described with reference to the appended drawings illustrating some preferred embodiments.

DETAILED DESCRIPTION OF THE SHOWN EMBODIMENTS

The present invention provides an apparatus and a method for making it possible to provide real-time gear condition information, i.e. to provide gear condition information during normal operation, of a torque transferring device. To be able to determine such gear condition information, a representation of a transferred torque $\tau_{tr}$ and a rotation angle $\alpha$ for the torque transferring device is needed. Such a representation, which also can be denoted a trace, includes one or more values for a transferred torque $\tau_{tr}$ at one or more rotation angles $\alpha$. From this representation, the gear condition can be determined for the meshing gears of the torque transferring device.

Figure 1A:
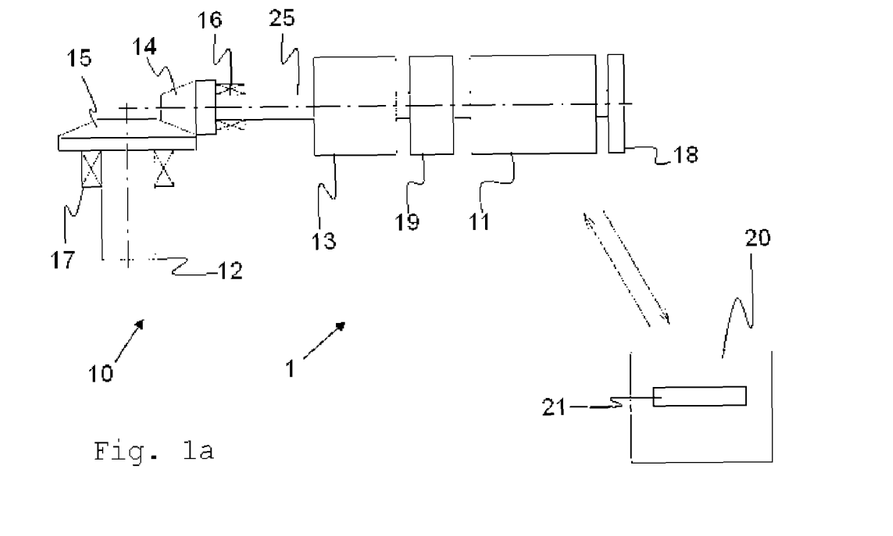
FIG. 1a shows a very schematic view of an apparatus according to one embodiment of the invention.

An exemplary apparatus in accordance with the invention is shown in FIG. 1a. The shown apparatus 1 comprises a torque transferring device 10 and control unit 20. The torque transferring device 10 includes a motor 11, a planetary gear unit 13, and a bevel gear 14, 15, which is connected to a socket 12 for connection to a nut, screw, bolt or the like. The planetary gear unit 13 includes one or more planetary gear, each including a sun gear, located axially inside at least two planet wheels, and one ring wheel. The planetary gear unit is arranged to lower the speed and to increase the torque of the rotational movement. Typically, in a torque transferring device, the gear ratio of a planetary gear unit is about 20 to 1 or more.

An angular meter 18 is arranged at the motor 11 to register the angular position α of the rotor of the motor 11. A torque meter 19 is arranged in connection to the motor output shaft that connects the motor 11 to the planetary gear unit 13 in order to monitor the transmitted torque $\tau_{tr}$. These are only exemplary locations of the angular meter 18 and the torque meter 19. Both the angular meter 18 and the torque meter 19 may be located anywhere along the drive shaft from the motor to the socket. Any calculations performed on the basis on the monitored rotational speed and torque from the angular meter 18 and the torque meter 19, respectively, will of course have to be adapted, based on the gearing ratio, to their actual location along the drive shaft.

The bevel gear comprises a pinion gear 14, which is arranged at the end of a pinion shaft 25, and a crown gear 15. The gears 14, 15 are arranged at a right angle with respect to each other. The pinion shaft 25 and the shaft of the crown gear 15 are mounted in bearings 16 and 17, respectively. In the specific embodiment the pinion gear 14 has 11 cogs, and the crown gear 15 has 17 cogs (not shown in the schematic figure). Hence, for every completed rotation of the pinion gear 14, the crown gear 15 will have rotated 11/17 of a full rotation. In other words the crown gear 15 will have completed 11 full revolutions when the pinion gear 14 has completed 17 full revolutions.

Figure 1B:
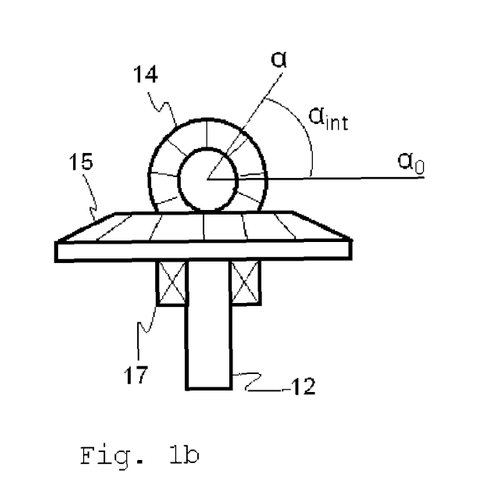
FIG. 1b shows a schematic view of meshing gears according to a first embodiment.

In FIG. 1*b* the exemplary bevel gear is shown in another angle, along the axis of the pinion gear 14. In the exemplary embodiment the angular meter 18 is arranged to continuously register the angular position α of the pinion gear 14. Typically, the transferred torque $\tau_{tr}$, which is continuously registered by the torque meter 19 will be mapped over an angular interval $\alpha_{int}$, corresponding to the rotation of the pinion gear 14 from an initial angle $\alpha_0$ to a current angle α. In this angle interval $\alpha_{int}$ a number of cogs of the pinion gear 14 will interact with an equal number of cogs on the crown gear 15. The length of this angular interval $\alpha_{int}$ may correspond to a part of a full turn of the pinion gear 14, or to one or several full turns thereof.

Figure 1C:
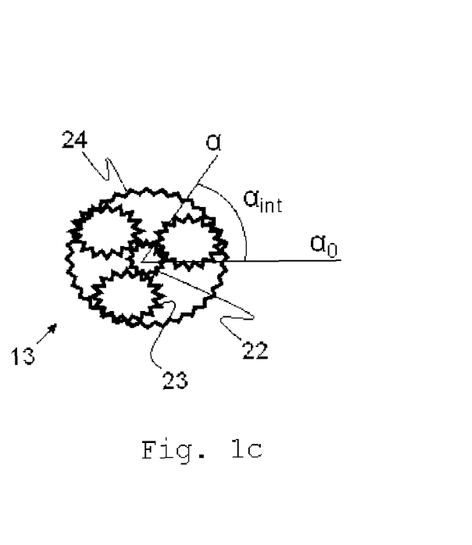
FIG. 1c shows a schematic view of meshing gears according to a second embodiment.

In FIG. 2*b* an exemplary embodiment of a planetary gear 13 is shown. The planetary gear 13 includes a sun wheel 22, which may be directly connected to a motor output shaft of the motor 11. Further, the exemplary planetary gear 13 includes a number of planet wheels 23 and a ring wheel 24. The ring wheel 24 may be fixed so that the planet wheels 23 will rotate between the sun wheel 22 and the ring wheel 24 in response to that the sun wheel 22 is rotated by the action of the motor 11. The planet wheels 23 are interconnected to an output shaft, which may e.g. the sun wheel of an additional planetary gear or, as indicated in FIG. 1*a*, the pinion shaft 25. In the shown embodiment the angular meter 18 is arranged to continuously register the angular position α of the sun wheel 22. The transferred torque $\tau_{tr}$ will in this embodiment be mapped over an angle interval $\alpha_{int}$, corresponding to the rotation of the sun wheel 22 from an initial angle $\alpha_0$ to a current angle α. Due to the down gearing achieved by the planetary gear 13, the sun wheel 22 will typically rotate about 20 times farther than the pinion shaft 25. Hence, normally, the sun wheel 22 will typically rotate over an angular interval $\alpha_{int}$ that corresponds to one or several full rotations thereof.

The invention is based on the notion that a damaged cog or tooth of a gear, e.g. in the planetary gear or in the bevel gear, has an impaired meshing profile with a reduced effectiveness in the power transmitting as a consequence. From this follows that it will take a higher torque to rotate the gear past a damaged tooth.

The apparatus 1 may be implemented directly on a torque transferring device 10, or in a control unit situated either at the torque transferring device 10, e.g. within a nutrunner, or separated from the torque transferring device, e.g. in a stationary or portable control unit 20, such as a computer or the like, which is in contact with the torque transferring device, e.g. via radio or cables. Hence, the processor 21, may either be implemented on the torque transferring device 10 or on a distant control unit 20 which communicates with the torque transferring device 10.

The invention relates both to a method and an apparatus. However, every step that is indicated to be performed in the inventive method may just as well be implemented to be performed by the processor of the apparatus. Also, steps that are indicated to be performed by a processor may be implemented as a step in the inventive method.

In a most general aspect the invention relates to an analysis of a representation of the monitored torque $\tau_{tr}$ over a monitored angular position α, from which analysis deviations from an expected representation may be identified in order to identify a gear condition.

The torque deviations typically relate to the level or amplitude of the monitored torque. A local peak in the monitored torque at a certain angular position α may indicate the existence of a damaged tooth of a gear.

Hence, the invention is based on the idea that the condition of the gears may be determined by means of a representation of the variation in torque over time or as function of the angular position α of at least one of the meshing gears.

In a specific embodiment of the invention, there is no referential angular position to compare the monitored angular position α to. In such an embodiment it is necessary to study the periodicity at which a deviation in the torque/angle occurs.

Therefore, in a specific example the periodicity at which the deviations are occurring is monitored. From the monitored periodicity it may subsequently be concluded which gear that includes a deteriorated tooth. In this case it may of course not be possible to conclude which tooth on the specific gear that is deteriorated. However, such information may be redundant. Namely, as long as it is possible to identify a deteriorated gear, an appropriate measure may be taken. For example, the tool may be taken out of operation such that the deteriorated gear may be repaired or exchanged. In some cases it may be sufficient to note an overall increased amplitude that signifies an evenly distributed wear of the gears. In such a case it will not be possible to identify a single deteriorated cog. On the other hand the overall wear may have reached up to a level that indicates that the gears should be replaced.

Further, under some circumstances it may be sufficient to know that there is a malfunction at one of the gears, no matter which, in order to determine that the tool should be taken out of operation, e.g. for further analysis.

However, even in the case when it is not important to which gear the malfunction is related, it may be of interest to study the periodicity of the occurrence of torque deviations in order to determine that the deviations actually depend on a gear condition and not on a random disturbance. In other words, if a specific deviation is not repeated with a periodicity that corresponds to any of the gears, that specific deviation may be disregarded from the determination of the gear condition.

A problem related to the analysis of a gear condition during normal operation of the torque transferring device is that each individual tightening or loosening operation performed by the torque transferring device 10 is often too short to provide any usual information on the condition of the gears.

This problem is solved in an embodiment of the invention in that a plurality of individual representations may be combined into combined representation that offers more information.

According to one embodiment of the invention, the processor 21 is arranged to include information of a transferred torque $\tau_{tr}$ over an angle interval corresponding to a complete rotation for the meshing gears of interest in the combined representation, e.g. the two gears of the bevel gear 14, 15 and/or all the individual gears of the planetary gear unit 13. Thus, the processor 21 may combine a high enough number of individual representations in order to generate information corresponding to a complete rotation of the meshing gears of the system. In other words, individual representations are joined together by appending them such that the combined representation has a length that covers a complete rotation.

For example, in the shown embodiment, the crown gear has 17 cogs and the pinion gear has 11 cogs. For a complete rotation of the meshing gears of the shown embodiment the socket, and thus the crown gear, has to been turned 11 full turns. The 11 full turns of the crown gear corresponds to 17 full turns of the pinion gear, such that both gears are back at their original position. The combined representation should hence include enough individual representations adding up to an angle of 11*360°=3960°. An absolute angle $\alpha_{abs}$ may be utilized for keeping track of where in the combined representation for the complete rotation an individual representation should be inserted, in order to cover all angles $\alpha$ of the complete rotation.

It is worth noting that two subsequent operations will normally not provide a torque-angle relationship for two angle ranges that are overlapping or even located in the vicinity of each other. This is due to the fact that the useful part of the representation may be short with respect to the total rotation involved in a tightening or loosening operation, such that the initial and/or final part of the operation will not be included in the representation. This, in turn, is due to the fact that only the part of the representation where the transferred torque is above a certain threshold is useful. This will be more closely described below with reference to FIG. 4.

According to one embodiment of the present invention, a combined representation of the transferred torque $\tau_{tr}$ and the rotation angle $\alpha$ for the torque transferring device is created by combining information from at least two individual system operations. Specifically, for each individual system operation, one individual representation of the transferred torque $\tau_{tr}$ and the rotation angle $\alpha$ is determined. Each such individual representation includes at least one transferred torque $\tau_{tr}$ and at least one corresponding rotation angle $\alpha$ of the individual system operation from which information may be extracted.

For a tightening operation, the torque will increase during the operation. For such operations the individual representation may be compensated for an increasing transferred torque $\tau_{tr}$ during the individual system operation to which it relates. For a loosening operation, on the other hand, torque will decrease during the operation. Hence, for such operations the individual representation may be compensated for a decreasing transferred torque $\tau_{tr}$.

Subsequently, the combined representation of the transferred torque $\tau_{tr}$ and the rotation angle $\alpha$ for the torque transferring device may be created by combining at least two compensated individual representations, whereby the combination results in the combined representation, which has a length that is long enough to be utilized for determining a gear condition. Thus, the individual representations are joined together appropriately, possibly over the complete rotations, to create the combined representation. A combined representation should not include representations corresponding to both tightening and loosening operations, since opposite sides of the cogs, which may not be deteriorated to the same degree, are used in these operations.

Thus, according to one embodiment of the present invention, the combined representation of the transferred torque $\tau_{tr}$ and the rotation angle $\alpha$ for the torque transferring device is created by combining a number of individual representations relating to a number of individual system operations. Thereby, it is possible to utilize a number of individual representations, where each individual representation in itself includes too little information to be useful for determination of a gear condition. Instead, a combined representation including enough information to determine the gear condition may be provided. To be able to combine these individual representations, and to keep the signature of the torque transferring device constant, each individual representation is, according to the present invention, compensated for the variation in torque amplitude caused by the increased (or decreased) torque during that individual system operation. The compensated individual representations can then be combined, since the influence of individual load levels has been removed.

Figure 2:
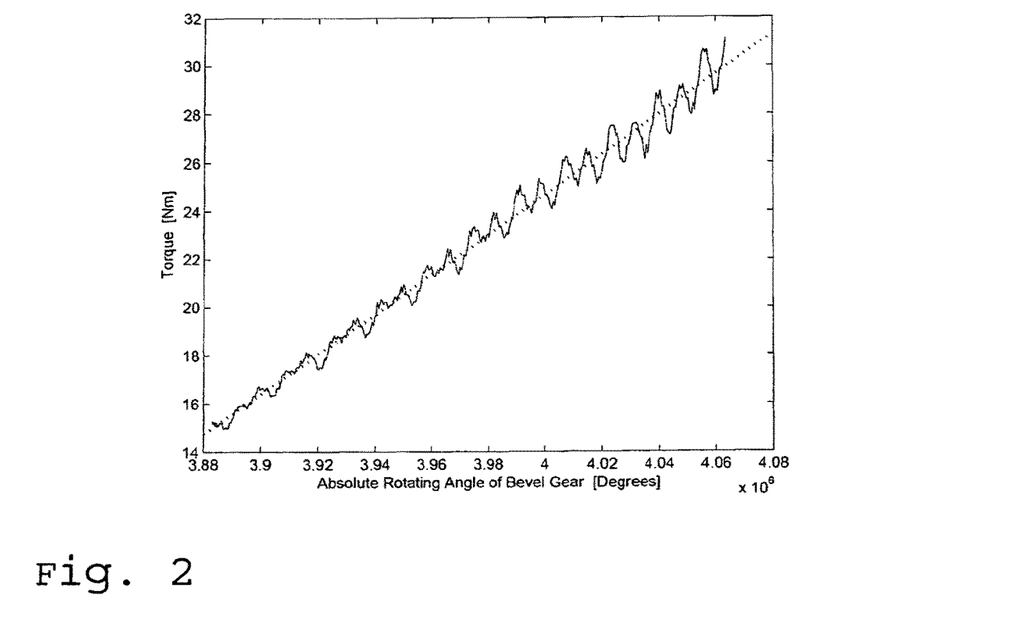
FIG. 2 shows increasing amplitude alterations with increasing absolute rotating angle.

The problem related to the increased load is illustrated in FIG. 2 for a torque transferring device 1 in the form of a nutrunner. As shown in FIG. 2, the amplitude of the torque alterations increases with an increasing torque level. Each individual system operation has a corresponding increase in torque alteration amplitude, which would cause errors in following analysis steps if the individual representations of the transferred torque $\tau_{tr}$ and the rotation angle $\alpha$ were to be combined without any compensation. This problem is solved by compensating for the varying transferred torque $\tau_{tr}$ during each individual system operation. The compensation results in individual representations of the transferred torque $\tau_{tr}$ and the rotation angle $\alpha$ for each individual system operation with peak amplitudes that are unaffected by the varying torque during the individual system operation, i.e. simulating an essentially constant transferred torque $\tau_{tr}$ during the individual system operation.

The individual representations of the transferred torque $\tau_{tr}$ and the rotation angle $\alpha$, may then, since the variation in torque during the individual system operations is compensated for, be combined into a combined representation of the transferred torque $\tau_{tr}$ and the rotation angle $\alpha$.

Thereby, a combined representation of the transferred torque $\tau_{tr}$ and the rotation angle $\alpha$ may be created from a number of individual system operations, whereby there is no need for taking the torque transferring device out of its normal use for determining this combined representation. Thus, according to one embodiment the present invention provides a combined representation of the transferred torque $\tau_{tr}$ and the rotation angle $\alpha$, which can be utilized for a real time condition determination, where the individual representations by them selves would be too short for such determination.

Figure 3:
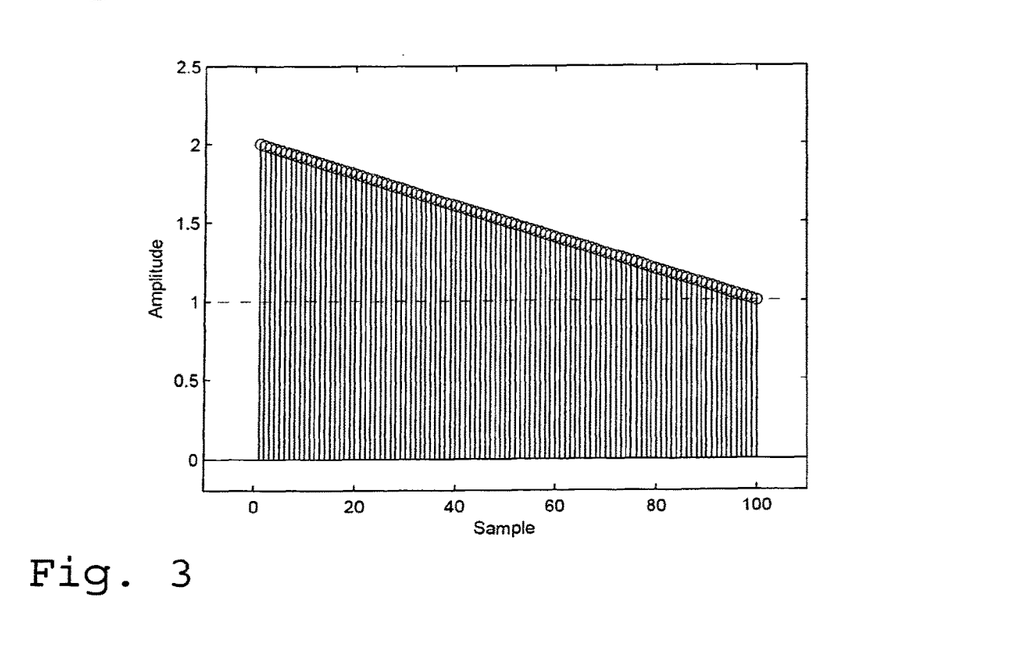
FIG. 3 shows a window function.

According to an embodiment of the invention, the compensation of the individual representation of the transferred torque $\tau_{tr}$ and the rotation angle $\alpha$ is achieved by applying a window function W to the individual representation. One example of such a window function W is shown in FIG. 3. As can be seen in FIG. 3, the window function W has a shape including an amplitude that decreases with increasing sample numbers, where the decrease essentially correspond to the increase in torque causing the increased alteration amplitude peaks of the individual representations. According to an embodiment, the window function W decreases or increases linearly, from a start amplitude value that is dependent of a difference in amplitude levels of start and end points of the individual representation, to an end amplitude value of e.g. one (1). More generally, the window function may be inversely proportional to the mean value of the individual representation, no matter if it is linear or not.

Thus, when applying this window function on the individual representations, they are compensated for the varying torque such that the compensated individual representation simulates an essentially constant transferred torque $\tau_{tr}$ during the individual system operation. The application of the windowing function can also be seen as an amplitude normalization of the individual representations, resulting in a normalized individual representation simulating essentially constant transferred torque $\tau_{tr}$ over the individual system operation. The windowing function is adaptable, i.e. not fixed. The windowing function is individual for each individual representation, and will change depending on the load during each individual system operation and on the torque around which the normalizing is done.

According to an embodiment of the present invention, the rotation angle $\alpha$ and the corresponding transferred torque $\tau_{tr}$ for each individual representation are chosen so as to indicate an influence of teeth of the meshing gears as a relationship between the rotation angle $\alpha$ and corresponding transferred torque $\tau_{tr}$ of the individual system operation. Thus, the cropped data hereby includes the valuable information of the meshing gears teeth influence for each individual system operation.

Often, a segment of an individual system operation includes close to linearly increasing values for the transferred torque $\tau_{tr}$ over the rotation angle interval $\alpha_{int}$. These close to linearly increasing values usually include the valuable information of the meshing gears teeth influence. For e.g. an electrical nutrunner, this segment is linearly increasing because the joint behaves linearly in relation to the rotation angle $\alpha$ throughout this segment.

Figure 4:
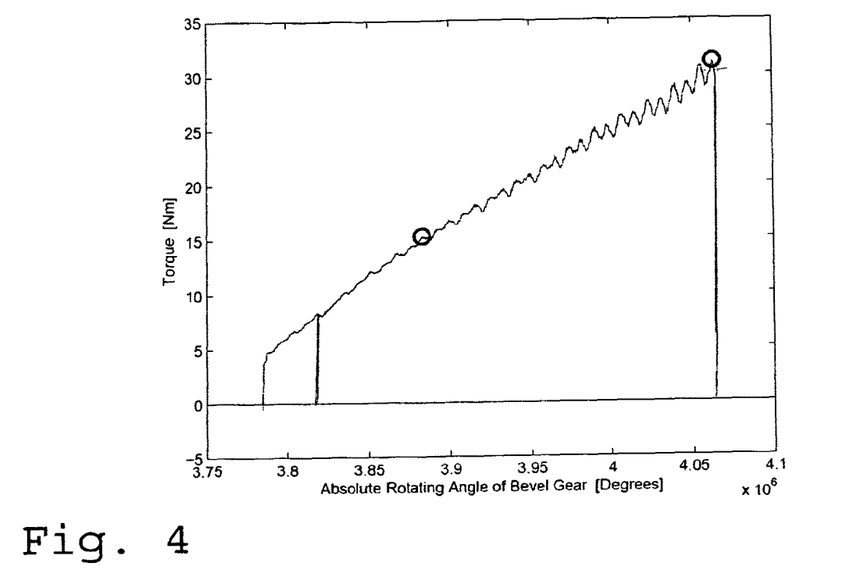
FIG. 4 shows a linear portion of an individual system operation.

FIG. 4 shows one example of torque and absolute angle for an individual system operation for a nutrunner, wherein the individual system operation includes one nut tightening. The interesting portion, which includes the valuable information of the individual system operation, lies between the shown circular markers in FIG. 4. The left marker indicates a starting angle $\alpha_1$ of the interesting portion of the individual system operation, and the right marker indicates an end angle $\alpha_2$ of the interesting portion.

The starting angle $\alpha_1$ is, according to an embodiment, chosen such that the selected interesting portion corresponds to a transferred torque $\tau_{tr}$ above a signal to noise level (SNR) of the apparatus. The end angle $\alpha_2$ is chosen such that it corresponds to a transferred torque $\tau_{tr}$ that is close to a target torque $\tau_{target}$. Such a target is normally used by the torque transferring device 1 and is thus available for identification of the interesting region including the valuable information of the meshing gears teeth influence. According to this embodiment, the interesting portion is extracted from the individual system operation and is used for determining the individual representation of the transferred torque $\tau_{tr}$ and the rotation angle $\alpha$. This can also be seen as cropping the individual system operation data to its interesting part. Thus, the individual representation shown in FIG. 2 corresponds to the interesting region of the individual system operation shown in FIG. 4.

According to an embodiment of the invention, the determination of the individual representations includes removing a trend from each one of the individual representations. The detrending causes each detrended individual representation to have an amplitude with a mean torque centered around a specific torque, such as e.g. zero (0) Nm. Thanks to this zero-mean characteristic of each detrended individual representation, a plurality of representations may be joined into a combined representation, centered around the specific torque.

According to an embodiment of the invention, this detrending is performed by subtracting a trend corresponding to the mean torque value from the individual representation of the transferred torque $\tau_{tr}$ and the rotation angle $\alpha$, thereby obtaining a detrended individual representation that is centered around a torque $\tau_{tr}$ of approximately zero Nm, i.e. having a mean value close to zero.

Figure 5:
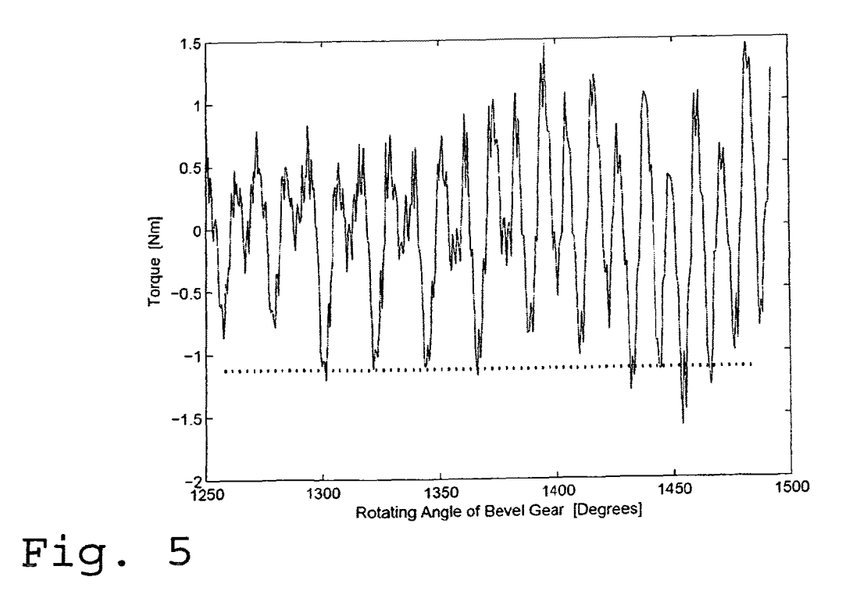
FIG. 5 shows a compensated and detrended individual representation.

FIG. 5 shows an example of a compensated and detrended individual representation corresponding to the above individual system operation of FIG. 4. As can be seen in FIG. 5, this detrended individual representation has a mean value that is close to zero and simulates an error signal from an essentially constant transferred torque $\tau_{tr}$ during the individual system operation, i.e. the detrended individual representation is centered around a transferred torque $\tau_{tr}$ of zero Nm to only simulate the influence of the meshing gears. In comparison, the signature meshing of gear teeth would be difficult, if not impossible, to obtain if no a load is present on the torque transferring device 1.

A detrended individual representation, as the one shown in FIG. 5, can be utilized for determining the condition of the gears in the torque transferring device 1. Further, two or more such detrended individual representations may be joined together to provide a combined representation, which subsequently may be utilized for determining the condition of the gears in the torque transferring device 1.

According to an embodiment of the invention, an absolute angle $\alpha_{abs}$ is utilized for determining an angle relationship between two angularly subsequent individual representations that are combined. In this case, the rotation angle $\alpha$ used in each individual representation of the transferred torque $\tau_{tr}$ and the rotation angle $\alpha$ is an absolute, i.e. non-relative, angle $\alpha_{abs}$. This makes it possible for the two angularly subsequent individual representations to be joined together at a correct rotation angle $\alpha$, in order to provide a combined representation of high quality.

The use of the absolute angle $\alpha_{abs}$ thus makes it possible to make a very exact gear condition determination. The two angularly subsequent individual representations need not to be related to two in time sequentially performed individual system operations. Thus, the use of the absolute angle $\alpha_{abs}$ also makes it possible to keep track of where to insert a specific individual representation into a combined representation in order to create a complete combined representation, possibly over complete periods of the system rotation, as will be explained below.

According to an embodiment of the present invention, the desired combined representation of the transferred torque $\tau_{tr}$ over the rotation angle interval $\alpha_{int}$, includes information of a transferred torque $\tau_{tr}$ over an angle interval corresponding to a complete rotation for all of the meshing gears of the torque transferring device 1. Thus, a number of individual system operations may have been made, each resulting in an individual representation covering an angle interval $\alpha_{int}$.

If enough individual system operations are performed in order to produce a number of intervals of angles $\alpha$ that together cover a complete rotation of the meshing gears, the combined representation of the transferred torque $\tau_{tr}$ and the rotation angle $\alpha$ is a complete rotation representation including information of the complete rotation. Thus, the complete rotation representation of the transferred torque $\tau_{tr}$ and the rotation angle $\alpha$ is then usable to determine a condition for all of the possible cogging events from all of the meshing gears of the torque transferring device 1.

It is important to be able to keep track of the correct angle of the individual representations in order to correctly join them. Each individual representation has to be fitted into the combined representation in exactly the right position in order to result in a combined representation that is true to the gear teeth. The absolute angle $\alpha_{abs}$ may be utilized in order to keep track of the exact position for where an individual representation is to be inserted in the combined representation. Over time all angles of a complete rotation of the meshing gears will be represented in the complete combined representation.

Figure 6:
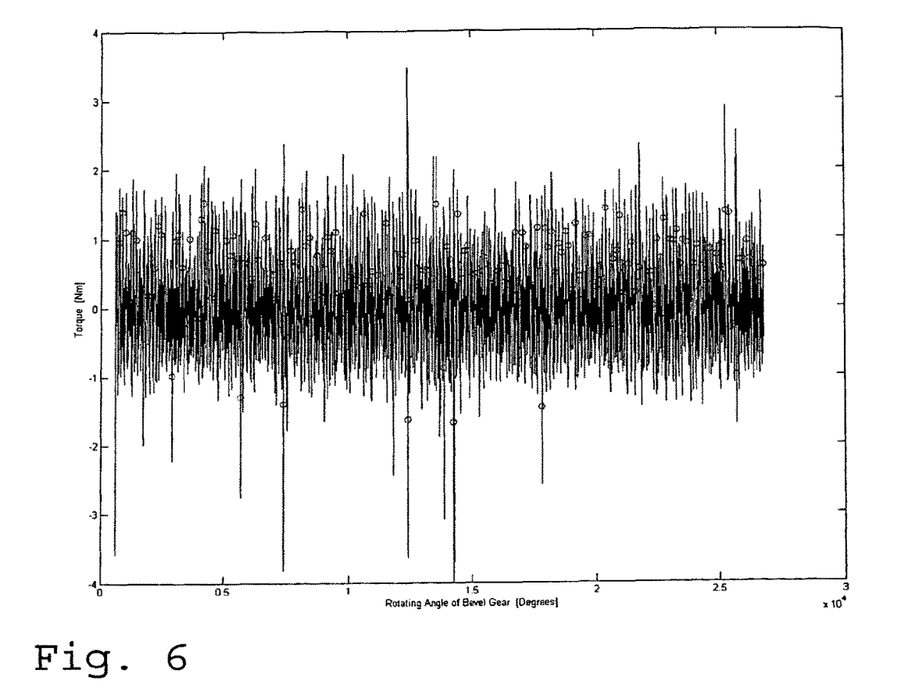
FIG. 6 shows a combined representation of a plurality of individual representations.

FIG. 6 shows an example of such a combined representation of meshing gear teeth over a number of angular degrees, in which transferred torque $\tau_{tr}$ and over absolute rotation angle $\alpha_{abs}$ for a number of individual representation have been combined. The circles indicate joining points. If further individual system operations are performed, and the corresponding individual representations are appended with angle values that are accurately placed where they belong in relation to a period of rotation for the nutrunner, the resulting combined representation can provide information from all angles of a complete rotation of the meshing gears of the nutrunner. Thus, the combined representation can then be utilized for determining the condition of all of the meshing gears of the nutrunner.

It is possible to trigger the registration of the transferred torque $\tau_{tr}$ as a function of the angular position $\alpha$. In such a case, the representation will directly be in the form of the transferred torque $\tau_{tr}$ as a function of the angular position $\alpha$. However, in another embodiment of the invention both the angular position $\alpha$ and the transferred torque $\tau_{tr}$ are monitored and registered at specific time intervals, such as every millisecond or every tenth millisecond.

According to the latter embodiment of the invention, the analysis of the combined representation may include a transformation of a time domain signal of the combined representation into a frequency domain signal of the combined representation. The transformation can for example be performed by the use of a Fourier transform, such as a Fast Fourier Transform (FFT). From this frequency domain signal, the gear condition can easily and reliably be determined, as will be described more in detail below. Thanks to the length of the combined representation, i.e. thanks to the combination of a number of individual representations into a combined representation of sufficient length, the transformation can be made with high accuracy, resulting in a frequency domain signal of the combined representation having a low noise level.

According to an embodiment of the invention, an equidistant re-sampling is performed on the time domain signal of the combined representation before it is transformed into the frequency domain. The equidistant re-sampling can also be performed on the time domain individual representations before combining them into a combined representation. The equidistant re-sampling achieves a simulated speed of operation, and constant angle distance between the samples of the combined representation, which removes the effects of varying speed during the individual system operations, thereby making it possible to represent the information of the combined representation in the frequency domain.

Figure 7:
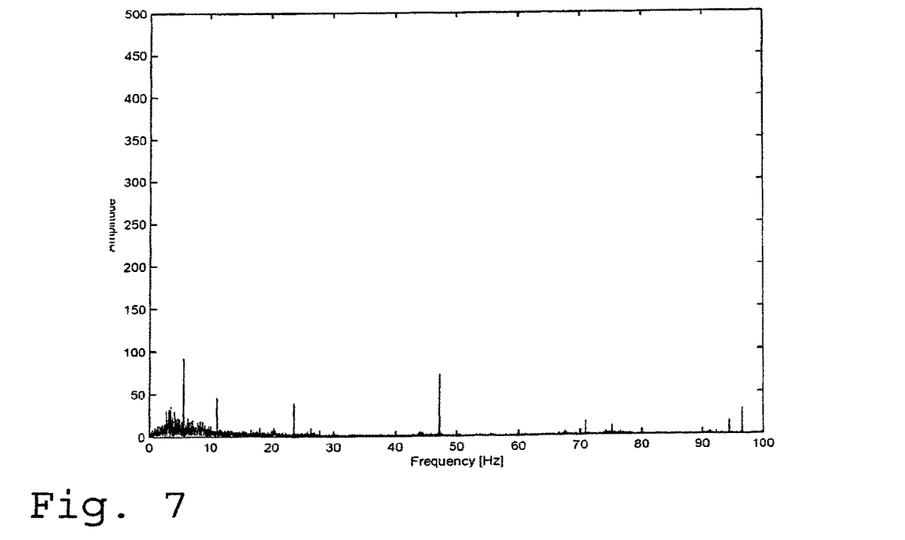
FIG. 7 shows a frequency domain signal of the combined representation for a healthy gear.
Figure 8:
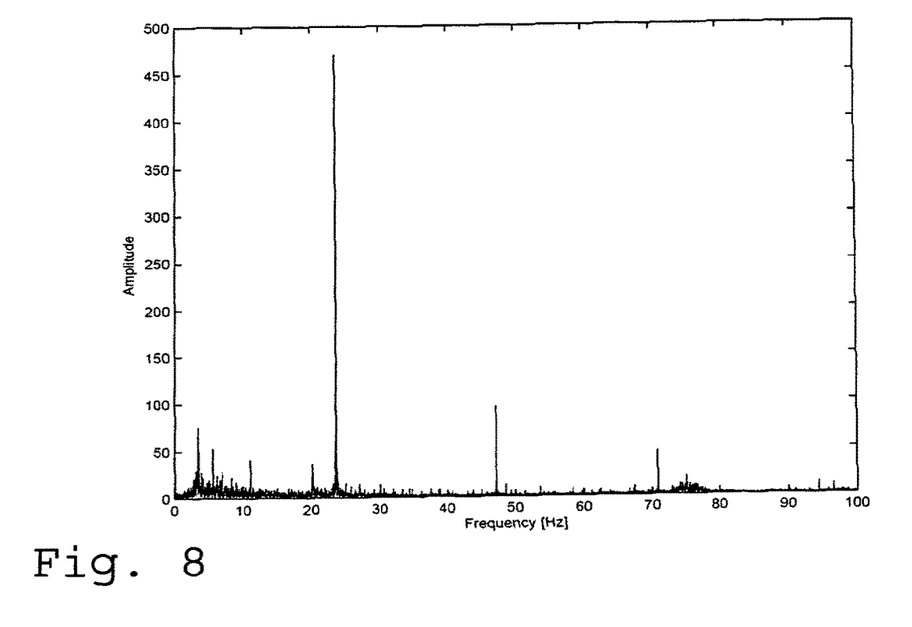
FIG. 8 shows a frequency domain signal of the combined representation for a deteriorated gear.

After the transformation, the condition of the meshing gears can be determined by amplitude analysis of the combined representation in the frequency domain. FIG. 7 shows an example of a combined representation signal in the frequency domain for a healthy bevel gear, and FIG. 8 shows an example of a combined representation signal in the frequency domain for a deteriorated bevel gear. From analysis of FIGS. 7 and 8, it is clear that a deteriorated bevel gear generates gear meshing frequencies of higher amplitude than that of a healthy bevel gear in the frequency domain signal. This is utilized by the specific embodiment of the invention to identify the condition of the meshing gears of the torque transferring device 1. However, determination of a state of health from the combined representation can be obtained in a number of different ways. Amplitude comparison is only one such analysis method. The accuracy and level of detail for the combined representation signal in the frequency domain is dependent on the length of the combined representation. Since the combined representation according to the present invention may include a number of individual representations, such that the combined representation has a considerable length, the characteristics of the combined representation signal in the frequency domain are very distinct. Therefore, deteriorations of the meshing gears can be easily detected.

According to another embodiment of the invention, the time domain signal of the combined representation is utilized for determining the gear condition. As for the frequency domain condition determination, amplitude analysis of the time domain signal may be used for identifying deteriorated gears. For this analysis, amplitude values, and more specifically changes in amplitude values, can be monitored to follow the gear condition.

The different steps of the method of the invention described above can be combined or performed in any suitable order. A condition for this, of course, is that the requirements of a step, to be used in conjunction with another step of the method of the invention, in terms e.g. of available information, such individual representations or combined representations, must be fulfilled.

The above described method and embodiments of the invention can be implemented in by a computer program, having code means, which when run in a computer causes the computer to execute the steps of the method. The computer program is included in a computer readable medium of a computer program product. The computer readable medium may consist of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

The method and apparatus according to the invention may be modified by those skilled in the art, as compared to the exemplary embodiments described above.

As is obvious for a skilled person, a number of other implementations, modifications, variations and/or additions can be made to the above described exemplary embodiments. It is to be understood that the invention includes all such other implementations, modifications, variations and/or additions which fall within the scope of the claims.

The invention claimed is:

1. An apparatus for determining a gear condition of meshing gears in a torque transferring device, wherein the torque transferring device comprises: (i) at least two meshing gears, (ii) a torque meter for monitoring a transferred torque ($\tau_{tr}$) in the torque transferring device, and (iii) an angular meter arranged to monitor an angular position ($\alpha$) of at least one of the meshing gears over at least one angular interval ($\alpha_{int}$),
wherein the apparatus comprises a processor that is adapted to:
map the transferred torque ($\tau_{tr}$) to the monitored angular position ($\alpha$) and create a representation of the transferred torque ($\tau_{tr}$) over an angular interval ($\alpha_{int}$),
append at least two individual representations of the transferred torque ($\tau_{tr}$) over at least two individual angular intervals ($\alpha_{int}$), each individual representation including at least one transferred torque ($\tau_{tr}$) over at least one corresponding monitored angular interval ($\alpha_{int}$);
create a joined-together representation from the appended at least two individual representations; and
analyze said joined-together representation in order to determine a gear condition of at least one of said at least two meshing gears in the torque transferring device,
wherein the processor is adapted to remove a trend from each individual representation before appending them, in order to determine a detrended representation that has an amplitude that is centered around a specific constant torque, wherein the detrending performed by the processor is arranged to compensate each individual representation for a varying transferred torque ($\tau_{tr}$) during individual system operation, and wherein the joined-together representation of the at least two individual representations of said transferred torque ($\tau_{tr}$) over said angle interval ($\alpha_{int}$) is based on the compensated representations.

2. The apparatus according to claim 1, wherein the processor is adapted to analyze an angular periodicity at which a deviation of the transferred torque occurs in order to locate a cause of the deviation to one of said meshing gears.

3. The apparatus according to claim 2, wherein the processor is adapted to analyze an amplitude of the transferred torque ($\tau_{tr}$) in order to identify deviations from an expected torque amplitude.

4. The apparatus according to claim 1, wherein said processor is adapted to create the joined-together representation such that the joined-together representation includes information of the transferred torque ($\tau_{tr}$) over an angle interval ($\alpha_{int}$) corresponding to a complete rotation for at least one of said at least two meshing gears.

5. The apparatus according to claim 1, wherein the processor is arranged in a separate control unit adapted to communicate with the torque transferring device, wherein the torque transferring device comprises a communication unit for communicating said transferred torque ($\tau_{tr}$) and angle interval ($\alpha_{int}$) of the meshing gears to the control unit.

6. The apparatus according to claim 1, wherein the apparatus includes a signaling device for signaling deterioration of at least one of said at least two meshing gears to an operator.

7. The apparatus according to claim 1, wherein said torque transferring device is a nutrunner, and said individual representation of said transferred torque ($\tau_{tr}$) over said angle interval ($\alpha_{int}$) is an individual nut tightening or nut loosening.

8. A method of determining a gear condition of meshing gears in a torque transferring device including at least two meshing gears, a torque meter for monitoring the transferred torque ($\tau_{tr}$), and an angular meter arranged to continuously monitor an angular position ($\alpha$) of at least one of the meshing gears over at least one angle interval ($\alpha_{int}$), the method comprising:
mapping the monitored torque ($\tau_{tr}$) to the monitored angular position ($\alpha$) of the meshing gears to create a representation of said transferred torque ($\tau_{tr}$) over said angle interval ($\alpha_{int}$),
appending at least two individual representations of said transferred torque ($\tau_{tr}$) over at least two individual angle intervals ($\alpha_{int}$), each individual representation including a transferred torque ($\tau_{tr}$) over an angle interval ($\alpha_{int}$) of an individual system operation,
providing a joined-together representation from the appended at least two individual representations; and
analyzing said joined-together representation in order to identify deterioration of at least one of said at least two meshing gears,
wherein the appending of said at least two individual representations includes removing a trend from each one of said at least two individual representations, in order to determine a detrended individual representation that has an amplitude that is centered around a specific constant torque.

9. The method according to claim 8, further comprising:
analyzing an amplitude of the transferred torque ($\tau_{tr}$) in order to identify deviations from an expected torque amplitude.

10. The method according to claim 8, wherein an absolute angle ($\alpha_{abs}$) is utilized for determining an angle relationship between two angularly differing individual representations, thereby allowing said two angularly differing individual representations to be joined together at a correct angular position ($\alpha$).

11. The method according to claim 10, wherein a magnitude of the amplitude of the detrended individual representation is further compensated for with respect to the trend of the amplitude.

12. The method according to claim 8, wherein said joined-together representation includes information of a transferred torque $T_{tr}$ over an angle interval corresponding to a complete rotation for all of said at least two meshing gears.

13. The method according to claim 8, wherein said analyzing includes a transformation of a time domain signal of said joined-together representation into a frequency domain signal of said joined-together representation.

14. The method according to claim 13, wherein an equidistant re-sampling is performed on said time domain signal of said joined-together representation or on at least two time domain signals of said at least two individual representations, respectively, before said transformation.

15. The method according to claim 13, wherein said deterioration is identified by comparing an amplitude of said frequency domain signal of said combined representation with at least one amplitude threshold.

16. The method according to claim 8, wherein the method is performed in actual operation of the torque transferring device.

17. A non-transitory computer-readable storage medium having stored thereon a computer program that is executable by a computer to determine a gear condition of meshing gears in a torque transferring device including at least two meshing gears, a torque meter for monitoring the transferred torque ($\tau_{tr}$), and an angular meter arranged to continuously monitor an angular position ($\alpha$) of at least one of the meshing gears over at least one angle interval ($\alpha_{int}$), the program causing the computer to execute functions comprising:

- mapping the monitored torque ($\tau_{tr}$) to the monitored angular position ($\alpha$) of the meshing gears to create a representation of said transferred torque ($\tau_{tr}$) over said angle interval ($\alpha_{int}$),
- appending at least two individual representations of said transferred torque ($\tau_{tr}$) over at least two individual angle intervals ($\alpha_{int}$), each individual representation including a transferred torque ($\tau_{tr}$) over an angle interval ($\alpha_{int}$) of an individual system operation,
- providing a joined-together representation from the appended at least two individual representations; and
- analyzing said joined-together representation in order to identify deterioration of at least one of said at least two meshing gears, wherein the appending of said at least two individual representations includes removing a trend from each one of said at least two individual representations, in order to determine a detrended individual representation that has an amplitude that is centered around a specific constant torque.

* * * * *